US008253339B1

(12) United States Patent
Godbole et al.

(10) Patent No.: US 8,253,339 B1
(45) Date of Patent: Aug. 28, 2012

(54) LIGHTING ELEMENT FAILURE DETECTION DEVICES AND METHODS FOR POWER SWITCHING BASED SYSTEMS

(76) Inventors: Kedar Godbole, San Jose, CA (US); Hariom Rai, Milpitas, CA (US)

( * ) Notice: Subject to any disclaimer, the term of this patent is extended or adjusted under 35 U.S.C. 154(b) by 210 days.

(21) Appl. No.: 12/838,363

(22) Filed: Jul. 16, 2010

(51) Int. Cl.
*H05B 37/02* (2006.01)
*H02J 1/10* (2006.01)

(52) U.S. Cl. .......... 315/149; 315/158; 315/225; 307/24; 307/66

(58) Field of Classification Search .................. 315/149, 315/158, 225, 224, 86, 129, 272, 307; 307/24, 307/66, 112, 64
See application file for complete search history.

(56) References Cited

U.S. PATENT DOCUMENTS 5,675,481 A 10/1997 Erisman
6,348,780 B1 2/2002 Grant
6,489,809 B2 12/2002 Kiehl
6,696,861 B1 2/2004 Baldwin et al.
7,656,096 B2 * 2/2010 Ribarich ....................... 315/224
7,710,050 B2 * 5/2010 Preston et al. ................ 315/312
7,876,103 B2 * 1/2011 Mihai et al. ................... 324/414
8,093,835 B2 * 1/2012 Godbole et al. .............. 315/307
8,129,916 B2 * 3/2012 Godbole ....................... 315/225
2005/0264239 A1 * 12/2005 Endo ............................ 315/224
2007/0108843 A1 * 5/2007 Preston et al. ................ 307/112

OTHER PUBLICATIONS

International Search Report of the International Searching Authority, dated Mar. 23, 2009 for International Application No. PCT/US2008/087359; 3 pages.

International Written Opinion of the International Searching Authority, dated Mar. 23, 2009 for International Application No. PCT/US2008/087359; 3 pages.

* cited by examiner

*Primary Examiner* — Vibol Tan

(57) ABSTRACT

A circuit may include a switch mode power converter that intermittently enables a current path in response to a switch control signal; a duty cycle measurement circuit that generates a duty cycle value corresponding to a duty cycle of the switch control signal; and an evaluation circuit that activates a failure indication in response to the duty cycle value being outside of at least one limit.

20 Claims, 7 Drawing Sheets

LIGHTING ELEMENT FAILURE DETECTION DEVICES AND METHODS FOR POWER SWITCHING BASED SYSTEMS

TECHNICAL FIELD

The present disclosure relates generally to switched mode power systems, and more particularly to lighting systems that drive a current and voltage according to a duty cycle of a control signal.

DETAILED DESCRIPTION

Figure 1:
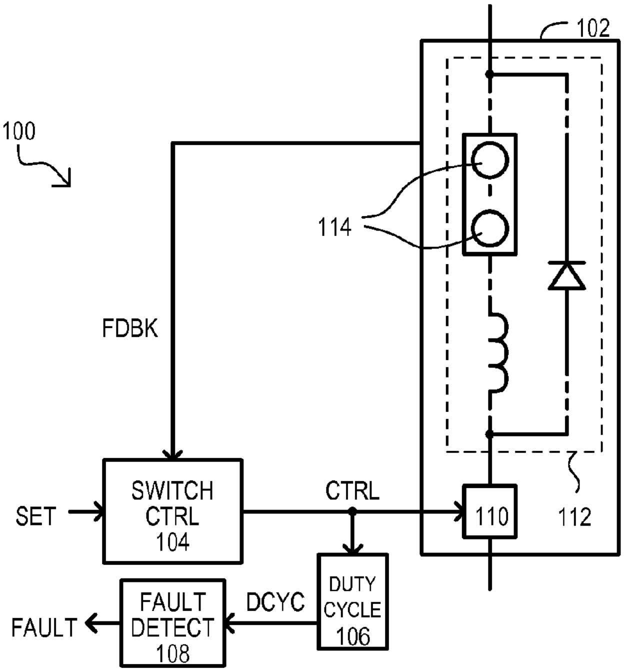
FIG. 1 is a block schematic diagram of a system according to one embodiment.

Various embodiments will now be described that show devices and methods for detecting failures of elements in a system having a switched mode power converter type operation, in which a current or voltage may be controlled by according to a control signal having a duty cycle. A duty cycle of such control signal may be measured for changes that may reflect failures of elements that cause changes in the impedance of such devices. In particular embodiments, such failures may include without limitation, light emitting diodes (LEDs) that fail as electrical opens, LEDs that fail as electrical shorts, as well as wiring defects and/or malfunctions of other components in an LED lighting assembly.

In the particular embodiments shown, like sections will be referred to by the same reference character but with the first digit(s) corresponding to the figure number.

Referring to FIG. 1, a system according to one embodiment is shown in a block schematic diagram and designated by the general reference character 100. A system 100 may include an assembly 102, a switch control circuit 104, a duty cycle measurement circuit 106, and a fault detect circuit 108.

In some embodiments, an assembly 102 in combination with switch control circuit 104 may be a switched mode power converter circuit that includes a switching device to draw current during one portion of the cycle, and an inductor to provide current on the other part of the cycle. Such embodiments may include "buck", "boost" or "buck-boost" modes of regulation.

An assembly 102 may include a switching device 110 and a controlled section 112. A switching device 110 may selectively enable a current path for controlled section 112 in response to a control signal CTRL. Control signal CTRL may vary between two or more levels according a duty cycle. Accordingly, a rate at which current is drawn through assembly 102 may vary in response to a duty cycle of control signal CTRL. It is noted that a "duty cycle" may include the relationship between the amount of time a control signal CTRL is active versus the amount of time the control signal is inactive within a given time period.

A controlled section 102 may include elements that may vary in impedance according to their functional state (i.e., working properly or faulty). In the embodiment shown, a controlled section 102 may include a number of elements 114, any one of which could be subject to failure. In one particular embodiment, elements 114 may include light emitting diodes (LEDs) that may fail in an open or short state. However, in other embodiments, such elements may include wiring paths between various circuit sections.

An assembly 102 may provide a feedback value FDBK to switch control circuit 104. A feedback value FDBK may represent an electrical value within controlled section 112, such as a current or a voltage.

A switch control circuit 104 may vary a duty cycle of control signal CTRL in response to a comparison between a setting signal SET and feedback value FDBK. A switch control circuit 104 may include any of various comparator circuits, control algorithms, filters, or other features to provide a desired response from assembly 102. In some embodiments, a switch control circuit 104 may operate to maintain a particular current value flowing within the assembly 102. However, alternate embodiments may operate to provide other responses, including but not limited to: maintaining a constant voltage or providing a predetermined dynamic current or voltage response.

A duty cycle measurement circuit 106 may measure a duty cycle of control signal CTRL to generate a duty cycle value DCYC. A measured duty cycle value DCYC may be provided to fault detection circuit 108.

A fault detection circuit 108 may monitor a duty cycle value DCYC. If a DCYC value exhibits predetermined changes or levels, a fault detection circuit 108 may activate a fault indication FAULT. In some embodiments, a fault detection circuit 108 may determine a fault condition based on historical duty cycle data. In a particular embodiment, a fault detection circuit 108 may acquire historical data (and other data such as temperature, etc.) and thus make a fault determination in a heuristic fashion as more and/or newer duty cycle data is acquired.

Making fault determinations based on a learning (e.g., heuristic) approach may result in closer tolerances than conventional approaches that may read a voltage or current flowing through an assembly 102. In particular embodiments, fault determinations may be based on one or more criterion, and a fault determination may be made based on a duty cycle being out of compliance with such a criterion.

In this way, a system may include a fault detector that may determine a fault condition in one or more elements of an assembly by sensing changes in a duty cycle used to drive a switching device within such an assembly.

Figure 2A:
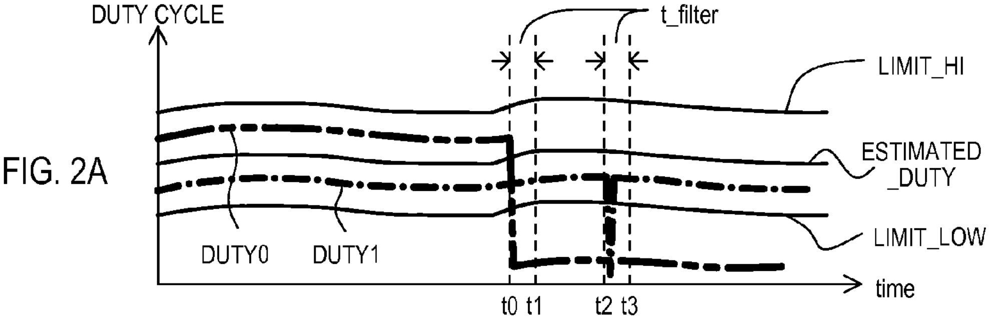
FIGS. 2A to 2C are of waveforms showing testing envelopes and testing operations according to various embodiments.

Referring now to FIG. 2A, duty cycle sensing operations according to particular embodiments are shown in a graph. Included in FIG. 2A are waveforms for an estimated duty cycle value (ESTIMATE_DUTY), a high limit value LIMIT_HI, and a low limit value LIMIT_LOW.

An estimated duty cycle value (ESTIMATE_DUTY) may correspond to an expected duty cycle. In some embodiments, such a value may be a baseline value programmed into a system, and may even be a constant value. However, in the embodiment shown, an estimated duty cycle value may be generated in response to a collection of values, including but not limited to any of: historical duty cycle data, historical temperature data, current temperature data, a user input setting value, power supply voltage level, or noise of operating environment.

High and low limit values (LIMIT_HI and LIMIT_LOW) may be generated from value ESTIMATED_DUTY, by offsetting such a value by some positive and negative amount. Such offsets may be predetermined values, or may be generated from a collection of values as noted above for the ESTIMATED_DUTY value. In an alternate embodiment, an ESTIMATED_DUTY value may be not be calculated, and limit values (LIMIT_HI and LIMIT_LOW) may be generated directly from a collection of values, including in an heuristic fashion, as described herein, and equivalents.

In the embodiment of FIG. 2A, high and low limit values (LIMIT_HI and LIMIT_LOW) may be conceptualized as creating an envelope for measured duty cycle values. If a measured duty cycle falls outside such an envelope, a failure indication may be detected.

Referring still to FIG. 2A, two other waveforms (DUTY0 and DUTY1) are shown to illustrate detection responses according to embodiments. Waveforms DUTY0 and DUTY1 may be two separate examples of measured duty cycles.

Prior to time t0, measured duty cycle DUTY0 may be within the envelope created by limits values (LIMIT_LOW and LIMIT_HI), thus a failure indication may remain inactive.

At about time t0, a measured duty cycle DUTY0 may fall below a low limit (LIMIT_LOW). Further, the measured duty cycle DUTY0 may remain below such a limit for a predetermined amount of time (greater than t_filter). Such an event may be considered a failure event, and generate a failure indication.

Referring still to FIG. 2A, prior to time t0, measured duty cycle DUTY1 may also remain within the envelope established by limit value (LIMIT_LOW and LIMIT_HI).

At about time t2, a measured duty cycle DUTY1 may also fall below a low limit (LIMIT_LOW). However, unlike duty cycle DUTY0, the low transition in duty cycle DUTY1 may be due to a transient event, such as noise, and returns to a value within the envelope within a time period t_filter. Consequently, the event is filtered out, and no failure indication is generated.

In this way, a fault detection circuit may generate an operating envelope within which measured duty cycle values are considered operational. A fault detection circuit may also filter measured duty cycles to prevent the generation of failure indications when duty cycle values temporarily fall outside the generated envelope.

Figure 2B:
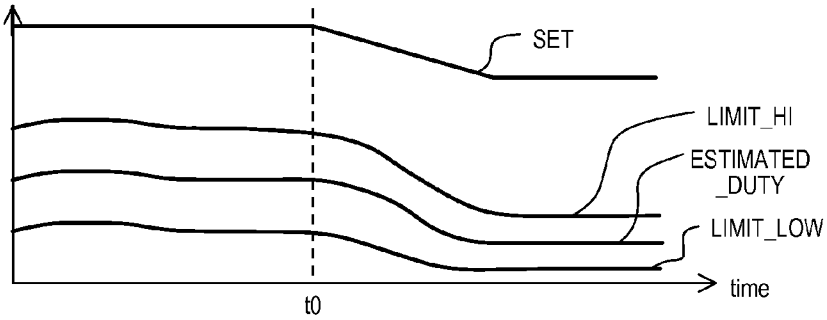

FIG. 2B shows how limits may be changed according to a setting input (SET). As but one example, a setting input (SET) may be a user control input to an LED assembly that may control an intensity of light by varying a duty cycle.

Referring to FIG. 2B, at about time t0, a value SET may transition from a higher value to a lower value. In response, an estimated duty cycle value (ESTIMATED_DUTY) and/or corresponding limit values (LIMIT_HI and LIMIT_LOW) may correspondingly change.

In this way, a fault detection circuit may generate an operating envelope that follows a control input that may vary a duty cycle.

Figure 2C:
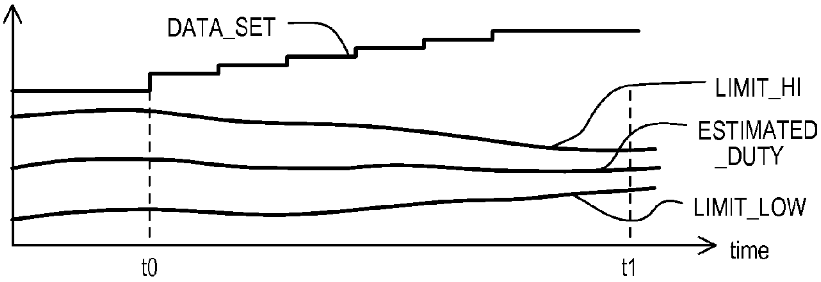

FIG. 2C shows how limits may be changed as historical data is acquired. In particular, limits values (LIMIT_HI and LIMIT_LOW) may be generated in a heuristic fashion, and thus may include tighter tolerances over time.

Referring to FIG. 2B, prior to time t0, a limit values (LIMIT_HI and LIMIT_LOW) may create a first envelope size to which a measured duty cycle may be compared. Such limits may be based on a data set size (DATA_SET). However, over time as data set size grows, an envelope may decrease in size. Consequently, in the embodiment shown, at time t1, a fault detection envelope may be substantially smaller than an initial envelope, like that prior to time t0.

In this way, a fault detection circuit may generate an operating envelope in a heuristic fashion that may decrease in size as more historic data is acquired.

While embodiments may evaluate various switching type circuits for failures of different kinds of elements, particular embodiments may be deployed to determine the failure of one or more LEDs in an LED lighting assembly by measuring a duty cycle of a signal generated to maintain a predetermined current through the LEDs. Such embodiments will now be described with reference to FIGS. 3A to 3C.

Figure 3A:
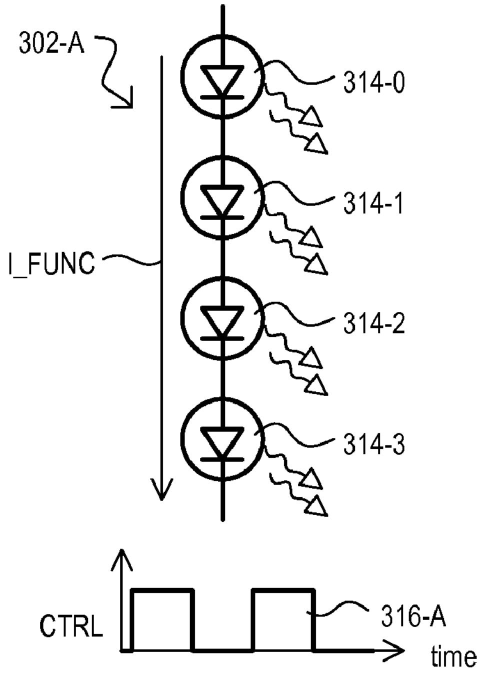
FIGS. 3A to 3C show duty cycle responses to normal operations and certain failure conditions in LED assemblies according to embodiments.

FIG. 3A shows a portion of an assembly 302-A having four LEDs (314-0 to -3) arranged in series with one another, as well as a graph showing a duty cycle 316-A for a control signal (CTRL) corresponding to assembly 302-A. Duty cycle 316-A may result in a current I_FUNC being drawn through LEDs (314-0 to -3). In this example, it is assumed that a duty cycle 316-A may be active when at a high level.

Figure 3B:
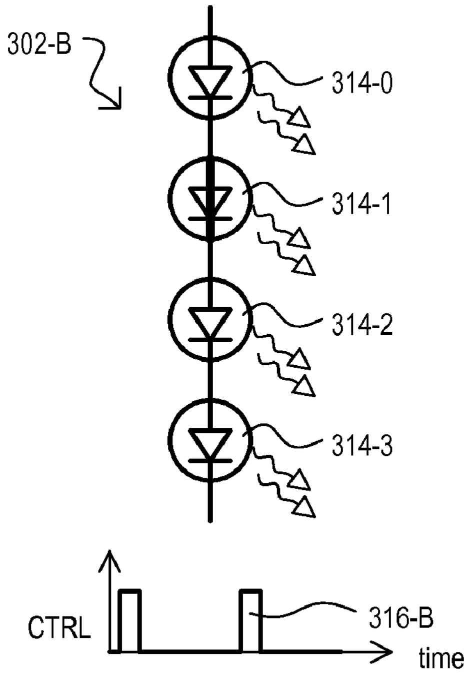

FIG. 3B shows an assembly in a case where LED 314-1 fails in a "short" condition (unacceptably low resistance). For a switch mode converter with a constant current objective, the duty cycle is determined as a function of at least the ratio of the output voltage to the input voltage. As a result, in an attempt to maintain a current I_FUNC through LEDs (314-0 to -3), a duty cycle 316-B may decrease (with respect to active levels). Such a decrease in duty cycle may be detected as a short condition within LEDs (314-0 to -3). It is noted that if more than one LED fails in a short condition, a duty cycle may decrease by an even larger amount. Consequently, measuring a duty cycle may detect a number of failures, and not only the presence of a failure.

Figure 3C:
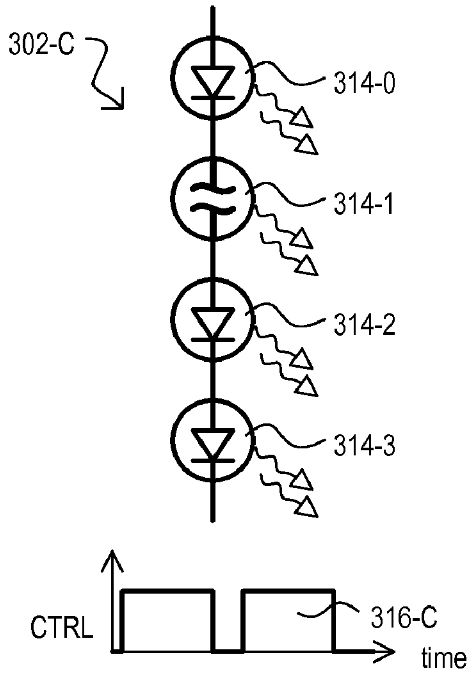

FIG. 3C shows an assembly in a case where LED 314-1 fails in an "open" condition (unacceptably high resistance). As a result, in an attempt to maintain a current I_FUNC through LEDs (314-0 to -3), a duty cycle 316-B may increase (with respect to active levels). Such an increase in duty cycle may be detected as an open condition within LEDs (314-0 to -3).

In this way, particular failure conditions of LED elements may be detected by measuring a duty cycle controlling a current through such elements. Such testing is in contrast to other approaches that may deploy additional circuits to directly test a current through, or voltage across LEDs. Such conventional approaches may require the addition of physical testing points into an assembly, undesirably increasing a size and/or cost of a system Referring now to FIG. 4, a system according to another embodiment is shown in a block schematic diagram, and designated by the general reference character 400. A system 400 may include an LED lighting assembly 402 and an integrated circuit (IC) device 418. An LED lighting assembly 402 may include an LED section 420 that may include one or more LEDs, a feedback resistor 422, an inductor 424, a switching device 410, a sense amplifier 426, and a flyback diode 428.

An LED lighting assembly 402 may have a "buck"-type switch power converter configuration connected between a high power supply voltage node VSUPP1 and a low power supply node VSUPP0. In response to a control signal (CTRL) being active, switching device 410 (which in this embodiment may be an n-type metal oxide semiconductor field effect transistor) may be activated (placed into a low impedance). This may enable a current path from a high power supply voltage node VSUPP1, through feedback resistor 422, LED section 420, and inductor 424, to a lower power supply voltage node (VSUPP0). In response to a control signal (CTRL) being inactive, switching device 410 may be inactive (placed into a high impedance). Consequently, inductor 424 may continue to draw current, driving such current through flyback diode 428.

IC device 418 may include a switch control circuit 404, a duty cycle measuring circuit 406, a fault detection circuit 408, and a temperature sensing circuit 430. A switch control circuit 404 may receive a feedback value FDBK, and in response, activate control signal CTRL. Changes in control signal may occur with hysteresis. As but one example, as a value FDBK falls below a first limit (HYS−), signal CTRL may be activated. However, signal CTRL may not be de-activated until it rises above a second limit (HYS+). Values HYS+ and HYS− may be generated in response to a setting SET, and optionally, other values such as a temperature value, for example. A setting SET may be provided by a user or other system to control the amount of current flowing through the lighting assembly.

A control signal (CTRL) output from switch control circuit 404 may be measured by a duty cycle measurement circuit 406 to generate a value DCYC, which may be provided to fault detection circuit 408.

A fault detection circuit 408 may receive duty cycle values (DCYC), temperature values (TEMP), a power supply voltage (from node VSUPP1), and a SET value. In response to such values, a fault detection circuit 408 may generate fault detection signals in a heuristic fashion, altering conditions under which a fault detection signal is activated. In a particular embodiment, as historical values for duty cycle measurements and temperature measurements are acquired, a fault detection circuit 408 may alter the limit(s) to which a current duty cycle is compared against when determining if a fault condition exists. Such limits may also vary according to power supply voltage level and a "baseline value". A baseline value may be based on various factors, including but not limited to: power supply voltage level, number of LEDs in section 420 of the assembly 402, parallel strings of LEDs in 420, type of LEDs in such a section, and physical configuration of assembly 402 (wiring types/lengths, resistance and inductance values of elements), and/or sense amplifier 426 type and response profile.

In one very particular embodiment, an integrated circuit device 418 may be a PowerPSoC® Embedded Power Controller manufacture by Cypress Semiconductor Corporation, having offices in San Jose, Calif., U.S.A. This may provide for a compact footprint for a controller of system 400. However, alternate embodiments may divide the various circuit sections shown in FIG. 4 over multiple devices.

In this way, a switch mode power converter LED lighting system may detect faults within one or more LEDs by examining a duty cycle to a switching device in a heuristic fashion.

Figure 4:
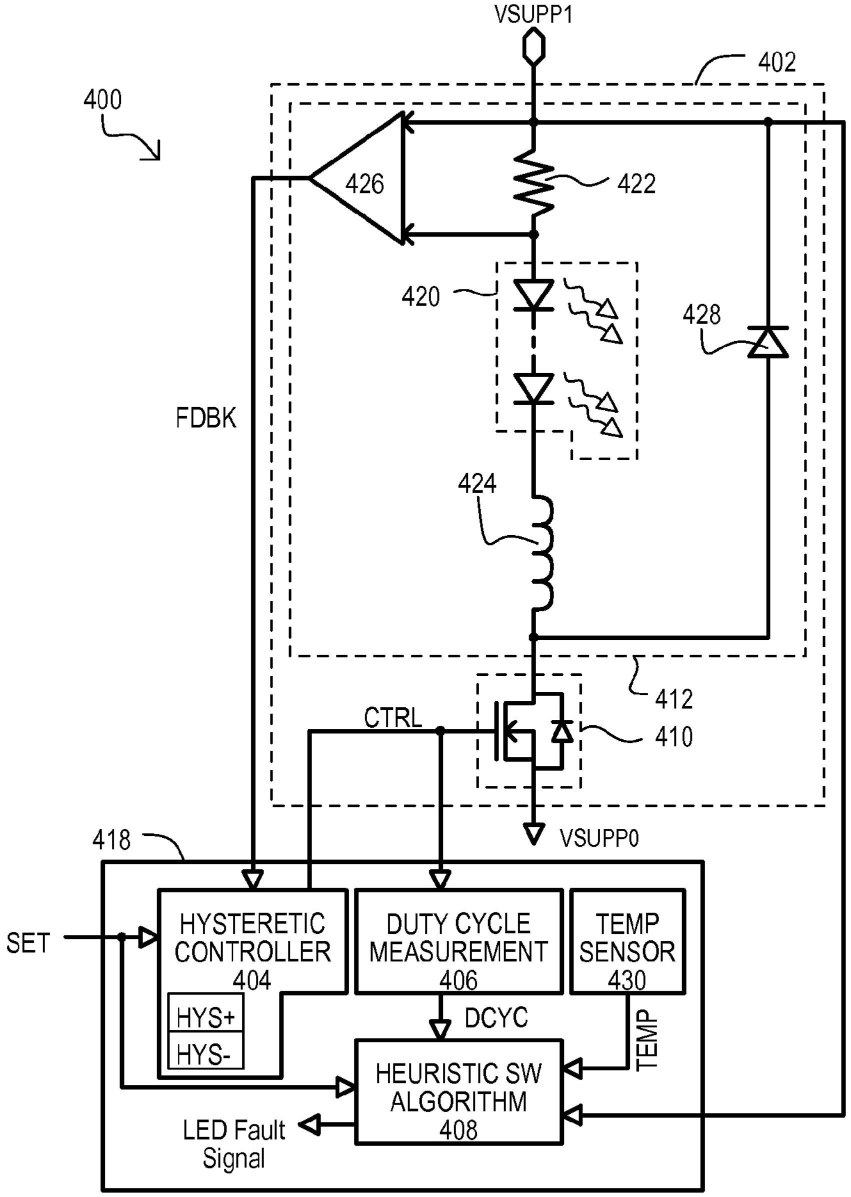
FIG. 4 is a block schematic diagram of an LED lighting system according to an embodiment.

It is noted that while embodiments of FIGS. 1 and 4 may measure a duty cycle from a signal driving a switching device, other embodiments could measure a duty cycle at other portions of a system, including but not limited to the assembly, various points in the switch mode converter loop, outputs of various logic elements, and outputs of various sense amplifiers. In one embodiment, the operation of a flyback diode may be measured to determine a duty cycle.

Figure 5:
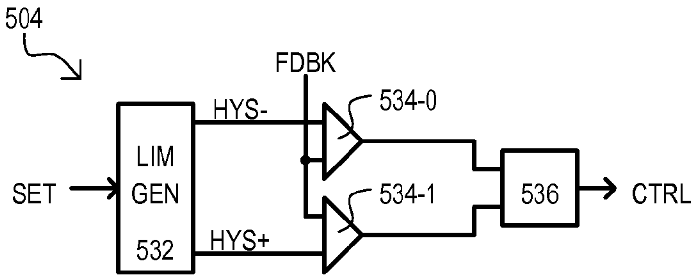
FIG. 5 is a block schematic diagram of a hysteretic controller that may be included in embodiments.

Referring now to FIG. 5, one particular example of a hysteretic controller that may be included in embodiments is shown in a block diagram and designated by the general reference character 504. A hysteretic controller 504 may include a limit generation circuit 532, comparators 534-0/1, and latching circuit 536. A limit generation circuit 532 may generate hysteresis limits (HYS− and HYS+) based on a received setting value SET as well as condition values (COND). Condition values (COND.) may include values for modifying hysteresis limit values according to operating conditions of a system, including but not limited to a temperature and/or power supply voltage level. Limit generation circuit 532 may provide a first hysteresis limit (HYS−) to a first comparator 534-0, and a second hysteresis limit (HYS+) to a second comparator 534-1.

Comparators 534-0/1 may compare a received feedback value (FDBK) to hysteresis limits (HYS−/HYS+) to generate output signals to latching circuit 536. A latching circuit 536 may toggle between active and inactive levels based on outputs from comparators 534-0/1.

It is noted that the hysteretic control circuit 504 of FIG. 5 is but one type of such circuit that may be included in embodiments shown herein.

Figure 6A:
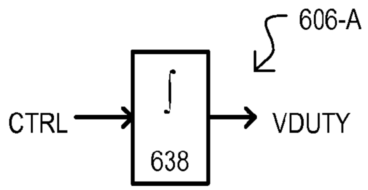
FIGS. 6A and 6B are block schematic diagrams of duty cycle measuring circuits that may be included in embodiments.

Referring to FIG. 6A, a duty cycle measurement circuit that may be included in embodiments is shown in a block diagram and designated by the general reference character 606-A. A duty cycle measuring circuit 606-A may receive a control signal (CTRL) that may have a duty cycle that may vary. An integrator circuit 638 may generate an analog value (e.g., voltage and/or current) VDUTY that varies in response to changes in duty cycle. Such a value may serve as, or be converted into, a measured duty cycle value DCYC to be acquired as historical information and/or examined to determine if a failure condition exists.

Figure 6B:
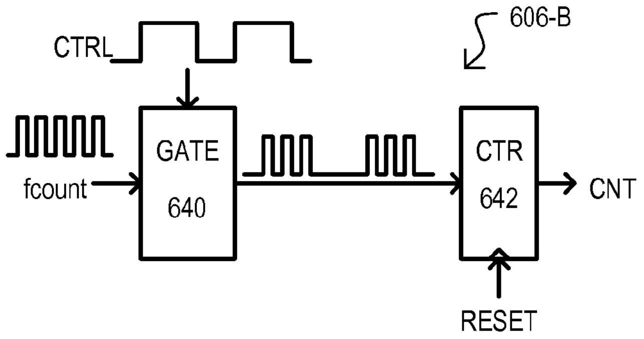

Referring to FIG. 6B, another duty cycle measurement circuit that may be included in embodiments is shown in a block diagram and designated by the general reference character 606-B. A duty cycle measuring circuit 606-B may include a gating circuit 640 and a counter circuit 642. A gating circuit 640 may receive a control signal (CTRL) that may have a duty cycle that determines the operation of a switch type power converter circuit. Gating circuit 640 may also receive a periodic signal fcount having a frequency substantially faster than a duty cycle of control signal (CTRL). Gating circuit 640 may output pulses at the fcount frequency when control signal (CTRL) is active, and may not output pulses when CTRL is inactive.

A counter circuit 642 may count pulses received from gating circuit 640 and output a count value CNT. A counter circuit 642 may be periodically reset by a signal RESET. A value CNT may serve as, or be converted into, a measured duty cycle value DCYC to be acquired as historical information and/or examined to determine if a failure condition exists.

As in the case of FIG. 5, it is noted that the duty cycle measurement circuits of FIGS. 6A and 6B are but two types of such circuits that may be included in embodiments shown herein.

Figure 7:
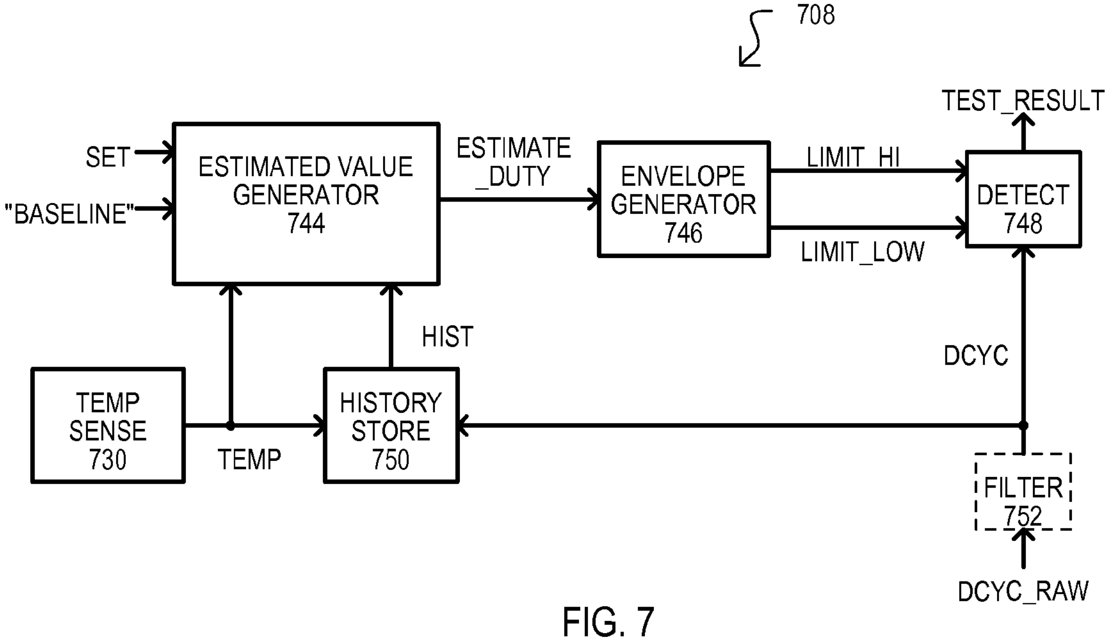
FIG. 7 is a block diagram of a fault detection circuit that may be included in embodiments.

Referring to FIG. 7, one particular fault detection circuit that may be included in embodiments is shown in block schematic diagram and designated by the general reference character 708. A fault detection circuit 708 may include estimated value generator 744, an envelope generator 746, a detection circuit 748, a temperature sensing circuit 730, a history store 750, and optionally, a filter 752.

An estimated value generator 744 may generate an estimated duty cycle value ESTIMATED_DUTY based on an input setting value (SET), baseline data (BASELINE), temperature value TEMP, and historical data value HIST. An estimated value generator 744 may be an analog circuit, digital circuit, or some combination thereof. A value SET may be an input value representing a desired response of a system (e.g., intensity level of LED assembly). A BASELINE value may a value based on a configuration of a system (e.g., supply voltage to a LED assembly, number of LEDs, component values, etc.). A temperature value (TEMP) may be a current temperature. A historical data value (HIST) may be based on previously acquired values, including measured duty cycle values and/or temperature values.

An envelope generator 746 may generate high and low limit values (LIMIT_HI, LIMIT_LOW) based on an ESTIMATED_DUTY value. Such limit values may be generated as noted above in conjunction with FIGS. 2A to 2C (e.g., may be constant offset values, or offset values generated from a collection of values, including historical data).

A detection circuit 748 may compare a received duty cycle value DCYC to limits (LIMIT_LOW and LIMIT_HI) and activate a failure indication TEST RESULT based on such a comparison. In some embodiments, a detection circuit 748 may include a filtering function, to ensure failure indications are generated only when a received duty cycle value DCYC remains outside of a limit for sufficient amount of time.

A temperature sensing circuit 730 may sense an ambient temperature and provide such a value to estimated value generator 744. In the embodiment shown, temperature values (TEMP) may also be provided to history store 748.

A history store 748 may store values representative of previous states of the system. In the embodiment shown, a history store 748 may receive duty cycle values (DCYC) as well as temperature values (TEMP). It is noted that while a history store 748 may store actual values acquired (i.e., raw readings), in other embodiments, values stored may be those created by an arithmetic, logic or other function operating on such received values.

In one embodiment, a history store 748 may include nonvolatile storage locations to retain such values in the absence of a power. Thus, fault detection capabilities may be retained over multiple power cycles of a system.

Optionally, a filter 752 may filter raw duty cycle values (DCYC_RAW) to measured duty cycle values (DCYC). Such a filtering may ensure a measured duty cycle value (DCYC) represents a duty cycle value or range over a sufficient period of time, to reduce and/or eliminate false transitions due to noise or the like.

Figure 8:
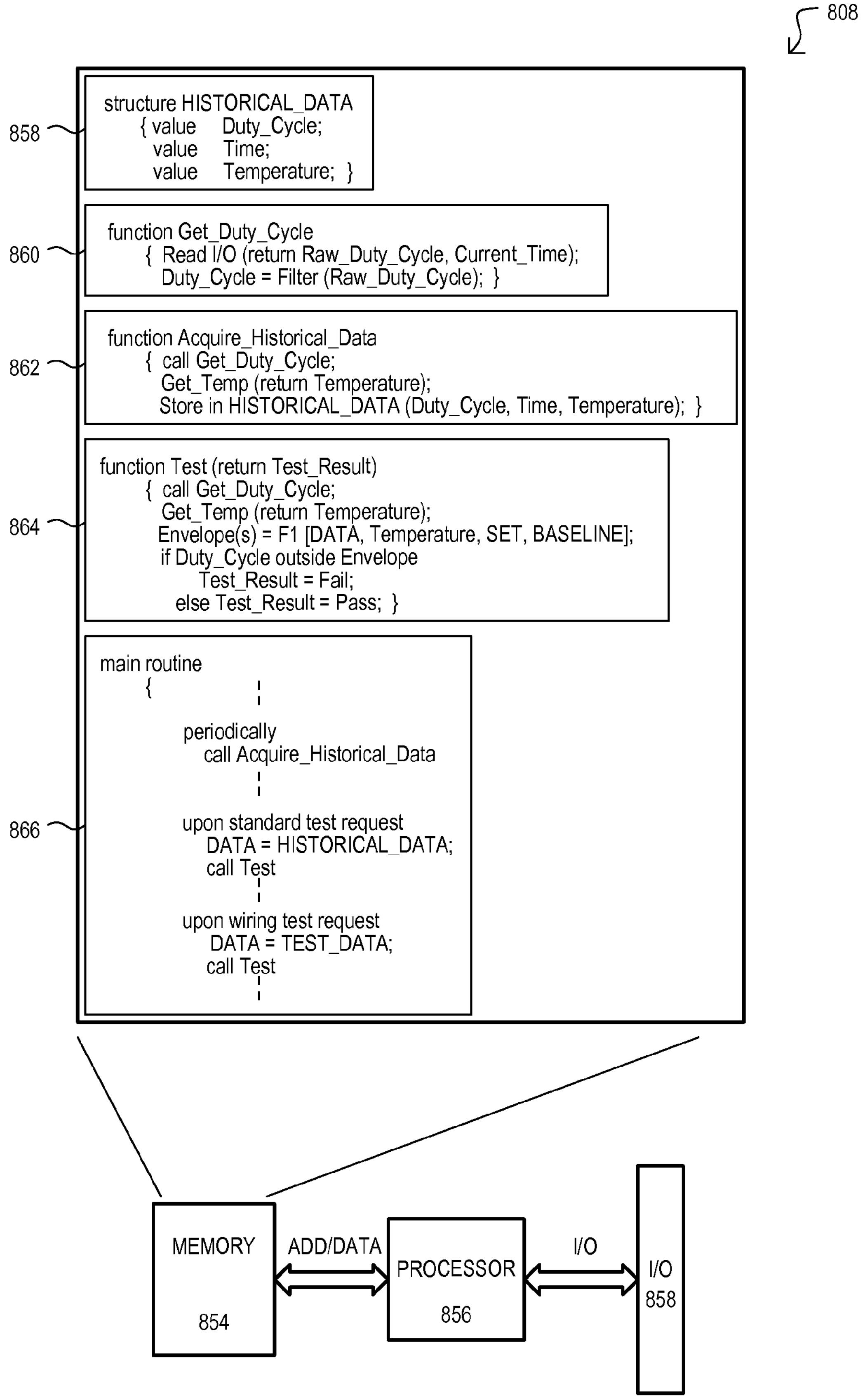
FIG. 8 is a block diagram of another fault detection circuit that may be included in embodiments.

Referring to FIG. 8, another fault detection circuit that may be included in embodiments is shown in a block diagram, and designated by the general reference character 808. A fault detection circuit 808 may be implemented as a processor executing instructions stored in one or more memories. In the particular embodiment shown, a fault detection circuit 808 may include a memory section 854 and a processor 856.

A memory section 854 may include instructions and/or data structures stored in memory locations accessible by a processor 856. In FIG. 8, items that may be stored in a memory section 854 are shown in a pseudocode form. Pseudocode is a broad way of describing a process. The pseudocode process may be implemented into particular code versions for use in a system employing a processor. In addition, the described processes may also be implemented in a higher level hardware designing language, to enable the preferred embodiment to be realized by a logic integrated circuit and/or programmed into a programmable logic device. Pseudocode is commonly used in industry and textbooks to express processes, and would be understood by one skilled in the arts of computer systems and/or hardware designing arts.

A fault detection circuit 808 may include a historical data structure 858, a duty cycle function 860, a data storing function 862, a testing function 864, and a main routine 866. A historical data structure 858 may store previously acquired values of a system. Such values may be utilized to generate an envelope in an heuristic fashion that may be compared against a measured duty cycle to determine if a fault has occurred. In the embodiment shown, a historical data structure 858 may store previously acquired duty cycle values, time values, and temperature values. It is understood that alternate embodiments may store calculated values, such as envelope values calculated under previous conditions. That is, a historical data structure 858 need not store "raw" data values. A historical data structure 858 may be periodically stored in a nonvolatile memory location, and then loaded into a volatile memory in the event of a power cycle or reset event in a system.

A duty cycle function 860 may acquire a measured duty cycle value. In the particular embodiment shown, such a function may read one or more input/output locations 868, which are understood to store a "raw" duty cycle value (Raw_Duty_Cycle) and a time value (Time). A duty cycle function 860 may filter a raw duty cycle value to generate a measured duty cycle value (Duty_Cycle). Such filtering may include ensuring that a measured duty cycle value (Duty_Cycle), represents a value over a predetermined time period that may filter out transient changes.

A data storing function 862 may utilize a get duty cycle function 860 to acquire a duty cycle. Such a function 862 may also utilize a get temperature function (Get_Temp) to acquire a temperature. Such values may then be stored in data structure 858, along with a corresponding time value (Time). In some embodiments, a data storing function 862 may store values in a nonvolatile memory location.

A test function 864 may utilize a get duty cycle function 860 to acquire a current measured duty cycle, and may also acquire a current temperature (Get_Temp). A test function 864 may then generate one or more envelope values (Envelope(s)). In the particular embodiment shown, envelope values may be an arithmetic function (F1) that operates on a data set (DATA), current temperature (Temperature), a set value (SET) and baseline data (BASELINE).

As will be described in more detail below, a data set (DATA) may vary according to the type of test being executed. For example, if a test is an operational test of an assembly (e.g., testing an LED assembly for failed LEDs), a data set (DATA) may be data stored in historical data structure 858. Thus, the envelopes generated for such a test may be calculated in an heuristic fashion. In contrast, if a test is an initial functional test, such as that performed by a manufacturer, a data set (DATA) data may be a test data set for detecting early life failures.

A set value (SET) may be a user input to a system to establish a given duty cycle of system. Baseline data (BASELINE) may be as described for other embodiments above—data corresponding to operating conditions and/or system configuration. A function (F1) utilized to calculate envelope values may take various forms, including but not limited regression analysis or trend estimation to interpolate or extrapolate envelope values from DATA, Temperature, SET and BASELINE values.

A test function 864 may then determine if a measured duty cycle (Duty_Cycle) is outside of an envelope. If a measured duty cycle is outside of an envelope (for a sufficient amount of time), a value Test_Result may be set to "Fail", otherwise, such a value may be set to "Pass".

A main routine 866 may include various commands and functions for operating a corresponding assembly (not shown). In the embodiment shown, a main routine 866 may periodically call data storing function 862, and thus build a historical record of duty cycle and temperature values. Upon receiving a standard test request, a main routine 866 may execute a test function 864 utilizing historical data stored in data structure 858 (i.e., DATA=HISTORICAL_DATA). A standard test request may be a request periodically executed to check for failures in an assembly. Upon receiving a wiring test request, a main routine 866 may execute a test function 864 utilizing predetermined test data (i.e., DATA=TEST_DATA). A wiring test request may be a request executed when an assembly is first manufactured, or installed, to check for initial or early life failures of elements.

It is noted that other embodiments may include mixes of circuits and processor executed portions, as shown in FIGS. 7 and 8, and equivalents.

While embodiments may expressed by block diagrams and waveforms, other embodiments may include methods expressed in flow diagrams. Examples of such embodiments will now be described.

Figure 9:
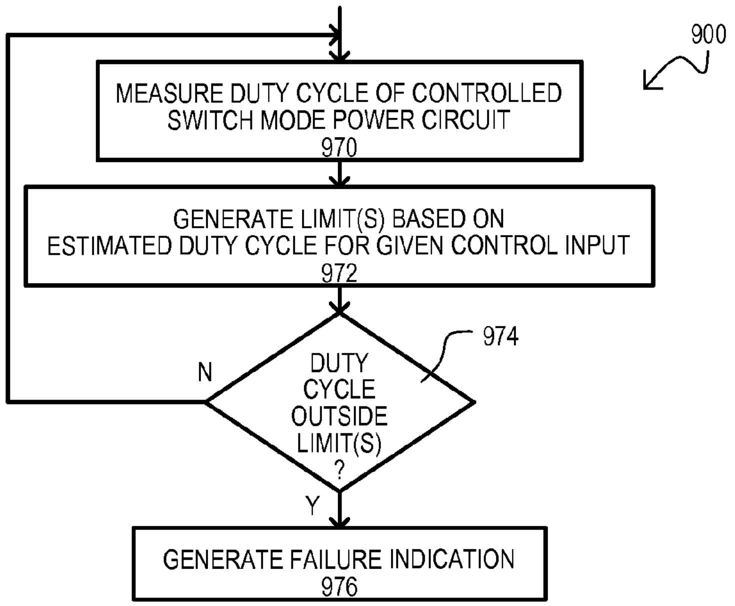
FIG. 9 is a flow diagram of a method according to an embodiment.

Referring now to FIG. 9, a method according an embodiment is shown in a flow diagram and designated by the general reference character 900.

A method 900 may include measuring a duty cycle of a controlled switch mode power converter circuit (970). Limits may then be generated based on an estimated duty cycle for a given control input (972). If a measured duty cycle is not outside of such limits (N from 974), a method 900 may return to 970. However, if a measured duty cycle is outside of such limits (Y from 974), a method 900 may generate a failure indication (976).

In this way, a status of elements within a switch mode power controlled system may be determined by measuring a duty cycle of such a system.

Figure 10:
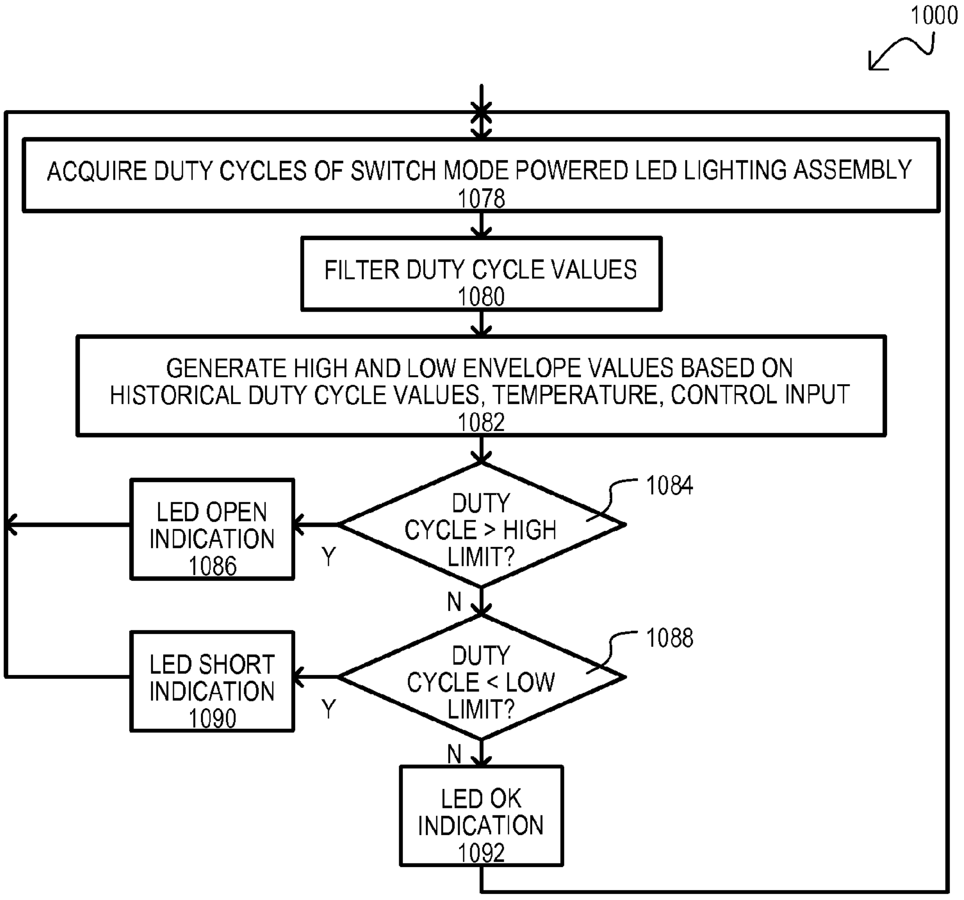
FIG. 10 is a flow diagram of another method according to an embodiment.

Referring to FIG. 10, a method according to another embodiment is shown in a flow diagram and designated by the general reference character 1000. A method 1000 may include acquiring a duty cycles of a switch mode power converter (1078). The duty cycles may be filtered (1080). Such an action may include filtering transitions that occur over a relatively brief period of time, such as those caused by noise. High and low envelope values may then be generated based on historical duty cycle values, temperature, and a control input (1082). A measured duty cycle may then be compared to high and low limits (1084 and 1086).

If a measured duty cycle is over a high limit (Y from 1084), a LED open indication may be activated (1086), and a method 1000 may return to 1078. If a measured duty cycle is below a low limit (Y from 1088), a LED short indication may be activated (1090), and a method 1000 may return to 1078.

If a measured duty cycle remains within high and low limits (N from 1088), LEDs can be deemed to be operating properly (1092).

In this way, LED elements may be tested for short or open failure conditions based on a measured switched mode power converter duty cycle being too high or too low.

Figure 11:
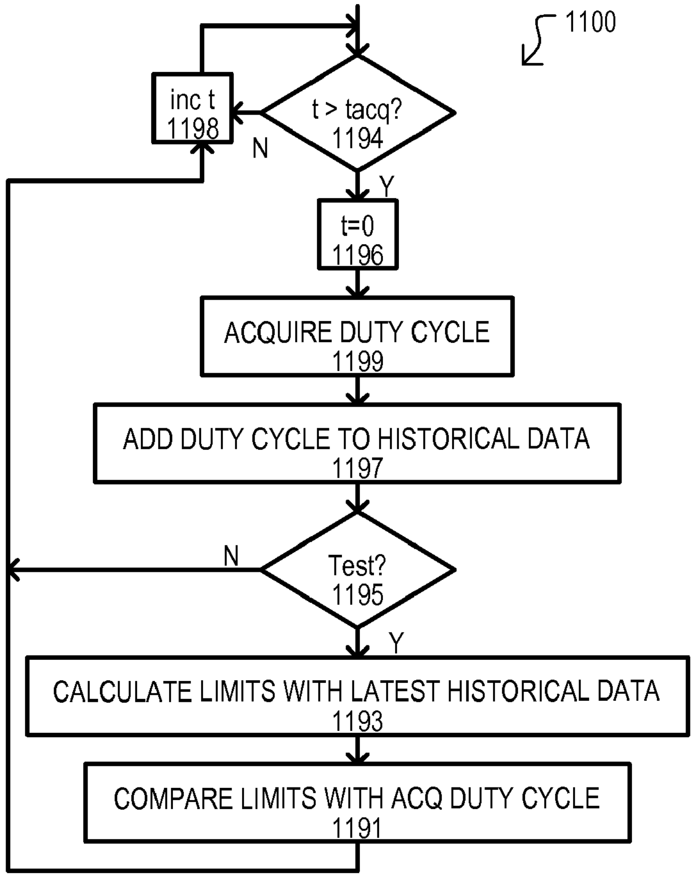
FIG. 11 is a flow diagram of a further method according to an embodiment.

Referring to FIG. 11, another method according to an embodiment is shown in a flow diagram and designated by the general reference character 1100. A method 1100 may acquire historical data, and then compare a duty cycle to limits based on such historical data.

A method 1100 may include determining when a time period (tacq) has been exceeded (1194, 1198).

When a time period has passed (Y from 1194), a method 1100 may reset a time value (1196) and then acquire a duty cycle value (1199). Acquiring a duty cycle may include measuring and filtering a current duty cycle of a switched mode power converter type system. A measured duty cycle may be added to a collection of historical data (1197). In this way, periodically, a method 1100 may sample and store duty cycle values, to build a historical record of duty cycle values. In some embodiments, other aspects of system operation may also be stored at this time, including but not limited to: a time value, temperature, other environment value (level of noise), or power supply voltage level, as but a few examples.

A method 1100 may then determine if a test is to be performed (1195). If a test is not to be performed (N from 1195), a method 1100 may return to determining when a next acquisition period (tacq) has passed (return to 1198). If a test is to be performed (Y from 1195), a method 1100 may calculate limits with latest historical data (1193), and then compare an acquired duty cycle to such limits (1191).

In this way, a method may periodically store duty cycle values to acquire historical data, and then test a measured duty cycle to limits calculated from such historical data.

Figure 12:
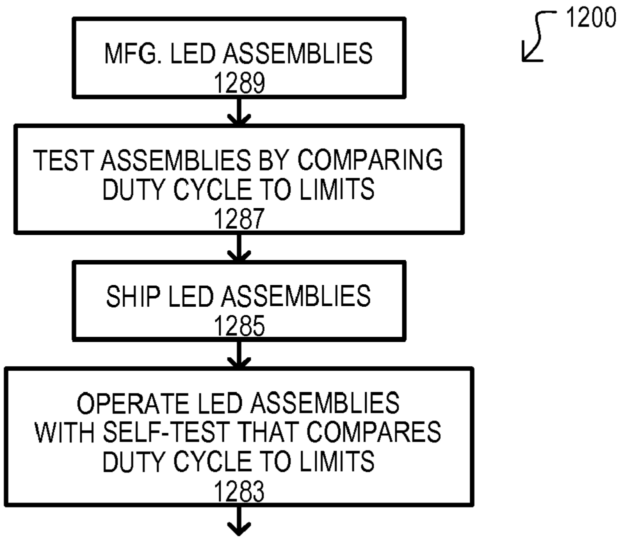
FIG. 12 is a flow diagram of still another method according to an embodiment.

Referring to FIG. 12, a further method according to an embodiment is shown in a flow diagram and designated by the general reference character 1200. A method 1200 may utilize a testing approach as a manufacturing step, as well as a periodic self-test in a finished assembly.

A method 1200 may include manufacturing LED assemblies (1289). Such an action may include manufacturing switched mode power converter type LED assemblies. These assemblies may include "final" LED assemblies with LED strings in place, or may include "intermediate" assemblies that may include "dummy" elements in place of actual LED elements. Assemblies may then be tested by comparing duty cycles to predetermined limits (1287). In the case of intermediate assemblies that include "dummy" elements, such a test may detect wiring defects, or defects in elements other than LEDs. In the case of "final" assemblies, such a test may determine if any LED elements have shorts or open failures.

LED assemblies may then be shipped (1285). Such action may include assemblies being provided to a wholesaler, reseller or customer. LED assemblies may then operate with a self-test that compares duty cycles to limits (1283). Such limits may be static limits, or such limits may be based on historical data, as described herein, or in equivalent approaches.

In this way, a method may utilize a duty cycle test in manufacturing of an LED assembly, as well as after such an assembly has been deployed.

It should be appreciated that in the foregoing description of exemplary embodiments, various features are sometimes grouped together in a single embodiment, figure, or description thereof for the purpose of streamlining the disclosure aiding in the understanding of one or more of the various aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

It is also understood that the embodiments of the invention may be practiced in the absence of an element and/or step not specifically disclosed. That is, an inventive feature of the invention may be elimination of an element.

Accordingly, while the various aspects of the particular embodiments set forth herein have been described in detail, the present invention could be subject to various changes, substitutions, and alterations without departing from the spirit and scope of the invention.

What is claimed is:

1. A circuit, comprising:

a switch control circuit that generates a switch control signal having a duty cycle that varies in response to at least a control input and a lighting assembly feedback signal; and a detection circuit that generates an indication when the switch duty cycle violates at least one limit; and a heuristic controller that generates the limit as a function of at least one temporal value of a system state.

2. The circuit of claim 1, wherein:

the heuristic controller that generates the at least one limit according to at least a plurality of values corresponding to a temporal succession of duty cycle values.

3. The processing circuit of claim 1, wherein:

a duty cycle measuring circuit coupled to the switch control signal that generates a measurement value corresponding to the duty cycle of the switch control circuit.

4. The processing circuit of claim 1, wherein:

the lighting assembly includes an inductor, at least one LED in series with the inductor, and a switching device that provides a current path to the inductor in response to the switch control signal.

5. The processing circuit of claim 1, wherein:

at least one of the temporal values of a system state is a power supply voltage to the lighting assembly.

6. The processing circuit of claim 1, wherein:

the fault detection circuit comprises a temperature sensor circuit that generates a temperature value based on a sensed temperature, and the at least one limit is a function of the sensed temperature.

7. The processing circuit of claim 1, wherein:

the detection circuit comprises at least one processor and an associated memory that stores instructions for comparing the switch duty cycle to the at least one predetermined limit.

8. A circuit, comprising:

a switch mode power converter that intermittently enables a current path in response to a switch control signal;

a duty cycle generation circuit that generates a control signal corresponding to the intermittent current path;

a heuristic controller that uses an algorithm to generate at least one compliance criterion for a system state based on a combination of temporal values of at least one state; and an evaluation circuit that activates an indication in response to non-compliance of the duty cycle to the at least one criterion.

9. The circuit of claim 8, wherein:

the switch mode power converter comprises a portion of a light emitted diode (LED) assembly that varies a switch control duty cycle to maintain a predetermined current flow through at least one LED.

10. The circuit of claim 8, further including:

a storage circuit that stores historical duty cycle data corresponding to previously acquired duty cycle values; and the evaluation circuit generates the at least one limit in response to at least the historical duty cycle data.

11. The circuit of claim 10, wherein:

the storage circuit comprises nonvolatile memory circuits.

12. The circuit of claim 10, wherein:

the evaluation circuit comprises a processor coupled to a memory that stores instructions, the instructions including a historical data acquisition function that acquires and stores duty cycle values to create the historical duty cycle data.

13. The circuit of claim 10, wherein:

The evaluation circuit comprises a processor coupled to a memory that stores instructions, the instructions including a test function that generates the at least one limit value based on the historical duty cycle data and compares a measured duty cycle to the at least one limit value.

14. A method, comprising:

measuring a duty cycle that controls a current flowing through at least one lighting element;

generating at least one limit from at least one temporal value of a system corresponding to a duty cycle generated when the at least one element is operational; and testing if the measured duty cycle is outside of the least one limit.

15. The method of claim 14, wherein:

measuring the duty cycle includes measuring a duty cycle of a signal that activates a switching device that selectively enables current to flow through an inductor; wherein the at least one element comprises a light emitting diode (LED) of an LED lighting assembly coupled to the inductor.

16. The method of claim 14, wherein:

generating at least one limit includes generating one of the following: a high limit and a low limit, and testing if the measured duty cycle is outside of the at least one limit includes generating an open failure indication when the measured duty cycle is outside one of the high or low limits, and generating a short indication when the measured duty cycle is outside the other of the high or low limits.

17. The method of claim 14, further including:

periodically storing duty cycle measurements to accumulate historical data; and recalculating the at least one limit in response to updates to the historical data.

18. The method of claim 14, further including:

filtering the measured duty cycle to prevent the generation of the failure indication when the measured duty cycle is outside of the at least one limit for less than a filter time period.

19. The method of claim 14, wherein:

measuring the duty cycle, generating the at least one limit, and testing if the measured duty cycle is outside of at least one limit are performed on a lighting assembly manufacturing step to identify early life failures.

20. The method of claim 14, wherein:

the at least one element includes a wiring of an assembly, and testing if the measured duty cycle is outside of the at least one limit tests for wiring malfunctions of the assembly.

* * * * *